United States Patent [19]

Bochmann

[11] 3,739,289

[45] June 12, 1973

[54] APPARATUS FOR DEMODULATION OF PHASE DIFFERENCE MODULATED DATA

[75] Inventor: Karlheinz Bochmann, Munich, Germany

[73] Assignee: Siemens Aktiengesellschaft, Berlin and Munich, Germany

[22] Filed: Aug. 30, 1971

[21] Appl. No.: 176,164

[30] Foreign Application Priority Data

Aug. 31, 1970 Germany .................. P 20 43 164.5

[52] U.S. Cl. .............. 329/104, 178/66 R, 325/320, 328/110

[51] Int. Cl. .............................................. H04l 27/22

[58] Field of Search ........................... 329/104, 110; 328/109, 110; 325/320; 178/66 R, 67, 88

[56] References Cited

UNITED STATES PATENTS

| | | | |
|---|---|---|---|
| 3,412,206 | 11/1968 | Bizet et al. | 325/320 X |
| 3,479,457 | 11/1969 | Oswald | 325/320 X |
| 3,485,949 | 12/1969 | De Haas | 325/320 X |
| 3,646,446 | 2/1972 | Rittenbach | 325/320 |
| 3,660,764 | 5/1972 | Goell | 325/320 |

*Primary Examiner*—Alfred L. Brody
*Attorney*—Harold J. Birch, John R. Swindler, Edward F. McKei, Jr.

[57] ABSTRACT

A circuit is described for demodulating phase difference modulated carrier signals. In particular for demodulating binary coded data, which are transmitted over a carrier frequency through certain phase shifts assigned, respectively, to the various data levels. A reference oscillator is provided in the demodulator for emitting a reference frequency signal having as many phases as there are phase states which have been established for message transmission. A timing generator is adjusted to produce a scanning pulse between two phase shifts, which scanning pulse has a minimum duration equal to the period of the carrier frequency. A first store is activated for the time duration of the scanning pulse. A gating pulse is generated from a crossover of the received carrier signal during the duration of the scanning pulse, and this facilitates the input of the reference phase from the reference oscillator agreeing with the carrier phase, in binary form, into the first store. Before the next scanning pulse occurs, the binary value in the first store is transferred to a second store. A decoder is provided for forming a difference value from the values in the two stores.

7 Claims, 5 Drawing Figures

APPARATUS FOR DEMODULATION OF PHASE DIFFERENCE MODULATED DATA

BACKGROUND OF THE INVENTION

This invention relates to a circuit arrangement for demodulation of phase difference modulated data signals, where the binary coded data are transmitted by sending specific phase shifts associated in common with the individual steps, or with several steps, in the transmitted carrier frequency.

There is a fundamental disadvantage in transmitting binary signals by means of a phase modulated carrier frequency; namely, the received signal is often ambiguous. This could lead, for example in the case of a binary signal, to the possibility that the "0" state and the "1" state could be erroneously interchanged. An auxiliary carrier frequency having a reference phase would be necessary for unambiguous demodulation of the signal at the receiver. That is, in certain cases, preferably in transmission of binary signals, an auxiliary carrier frequency can be recovered through phase inversion modulation from the received carrier frequency signal, yet its phase position is indeterminate by 180°. This ambiguity carries over directly to the demodulated signal as well. In phase modulation with more than two states the uncertainty of reception increases accordingly, so that it is capable, for example when four data levels are involved, of four possible interpretations.

The foregoing disadvantage can be avoided as is known, through the use of phase difference modulation. In phase difference modulation the data to be transmitted are not characterized by the phase position of the carrier frequency oscillation, but by the change of the phase position. For example, with binary modulation, the "zeros" are characterized by a phase change, and the "ones" are characterized by no phase change (or vice versa). With four level modulation two binary steps are expressed through a modulation process and, for example, a phase jump of +90° denotes the step-pair (debit) "01," a phase jump of −90° denotes the step-pair (debit) "10," a phase jump of 180° denotes the step-pair (debit) "11," and no phase jump denotes the step-pair (debit) "00."

The demodulation at the receiving end proceeds with the aid of a frequency generator, which produces a frequency which corresponds to the unmodulated carrier frequency and is synchronized to the received carrier frequency. The phase shift is determined from a comparison operation, and the correspondingly established step-combination is sent out as received data.

A demodulator circuit is known for demodulating phase difference modulated data signals. This demodulator directs the received carrier frequency to the inputs of two receiving modulators and two remodulation stages, in particular ring modulators. The outputs of the two receiving modulators are switched on to the other inputs of the two remodulation stages and connected with the output terminals of the demodulation arrangement. Between the outputs of the two remodulation stages and the other inputs of the two receiving modulators, there is connected in a carrier recovery circuit controlled by a time delay, which turns the two supplied carrier oscillations into two oscillations phase-shifted by ±45°. The carrier recovery circuit contains two mixing stages to which the output signals of the two remodulation stages are directed over phase-shifting filters and delay time networks. A more complete description of this circuit will be found in German Pat. application No. 1,198,869.

The known circuits are constructed using analogue techniques. Universal LC filter elements are necessary so that the required time lag is achieved. Further, modulators, constructed exactly symmetrically, and phase shifting elements are necessary, which for the required precision are also realized only in LC-technology.

It is an object of this invention to provide a demodulator circuit for phase difference modulated data signals which will overcome the foregoing difficulties and which can be constructed with digital construction stages.

SUMMARY OF THE INVENTION

The aforementioned and other objects are achieved in an apparatus in which a reference oscillator is utilized which emits as many phases of the reference frequency as there are phase states established for the transmission. A frequency generator is utilized, which emits a scanning impulse between two phase shifts with the minimum duration of one period of the carrier frequency. A first store is included, which is actuated for storage for the time duration of the scanning pulse. A feeding impulse is derived from a zero crossover of the received carrier frequency during the duration of the scanning pulse, which feeds the reference phase of the reference oscillator agreeing with the carrier phase into the first store in binary form. Before the appearance of the next scanning pulse, the binary value in the first store is transferred to a second store. A decoder is provided, which forms a difference value from the values fed into the two stores, and the decoder directs the voltage levels corresponding to the difference-value established after decoding to a parallel-series converter, at the output of which the binary data originate.

The demodulator operates digitally, so that only digital construction stages are used and construction using integrated circuit techniques is advantageous. The space required for the demodulator can thus be very small. The method of operation of the demodulator is especially simple.

BRIEF DESCRIPTION OF THE DRAWINGS

The invention will be best understood by reference to a description of a preferred embodiment given hereinbelow in conjunction with the drawings in which.

DETAILED DESCRIPTION OF THE DRAWINGS

Figure 1:
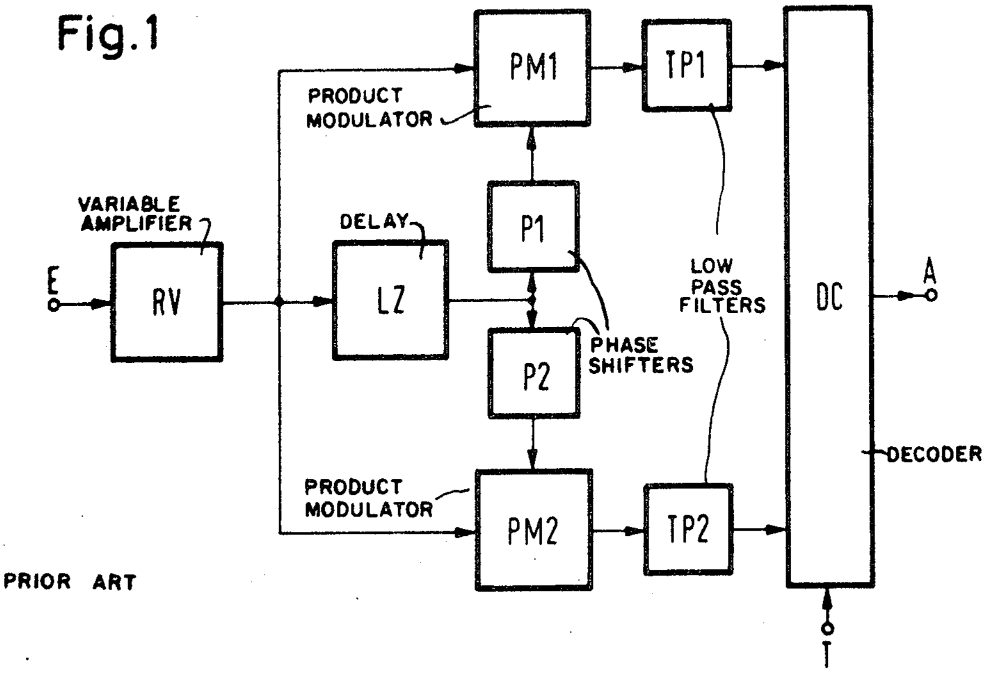
FIG. 1 is a block schematic diagram of a demodulator for phase difference modulated data signals using analogue techniques, illustrating the present state of the art.

FIG. 1 shows in principle a known arrangement for a demodulator for phase difference modulated data signals using analogue techniques. This arrangement is set up for a 4-valued (quaternary) phase difference modulation. The received carrier frequency, modulated with the phase shifts, arrives over the input E at a variable amplifier RV. The variable amplifier controls a delay time element LZ and, at the same time, product modulators PM1, PM2. The delay time element, which is constructed as a LC filter, delays the data signal by one modulation segment and directs the delay carrier frequency signal over phase shifting networks P1, P2, to the second input of the product modulation PM1, PM2. The modulating signal is recovered at the outputs of the product modulators, and it is freed of carrier frequency remnants by low-pass filters TP1, TP2. A scanning-decoder circuit DC reforms the original binary data according to the established coding, which data arrive at the data terminal device over the output A.

Figure 2:
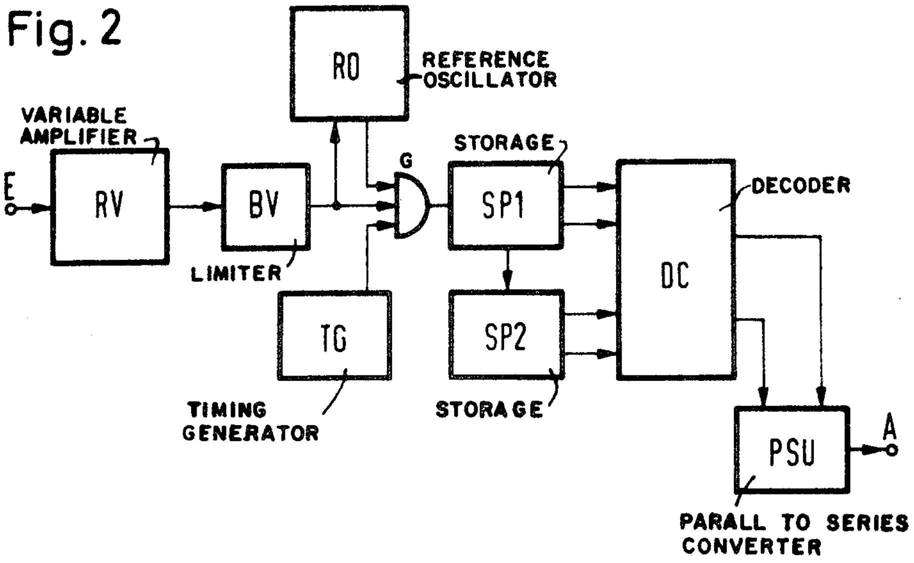
PRIOR ART Fig. 2
FIG. 2 is a block schematic diagram for a circuit for a demodulator for phase difference modulated data signals using digital techniques, illustrating the principles of the invention.

FIG. 2 shows in principle the demodulator for phase difference modulated data signals, according to the invention. At the input E, the carrier, frequency modulated with phase shifts, is received and brought to a constant intermediate level. The modulated (still in sinusoidal form) carrier frequency is transformed into a rectangular waveform in a succeeding limiter BV. Therewith, the phase modulation at the output of the limiter is still contained in the zero crossovers of the carrier signal.

A reference oscillator RO generates a frequency which corresponds to the carrier frequency. The reference frequency is generated in as many phase positions as there are possible phase states on the transmission path. The individual phases of the reference signal and the limited signal are applied to gate G. Gate G is controlled by a timing generator TG, which releases the gate for a specific duration. Before the gate G is released, the reference oscillator RO is corrected (synchronized) by an edge of the receiving signal. The timing generator releases the gate only for a specific duration, which is at least as long as the duration of the period of the rectangular waveform emitted by the limiter, and the crossover of the rectangular waveform falling in this space of time feeds the reference phase agreeing exactly with the phase of the rectangular waveform into a first store SP1 in binary form. The timing generator TG emits the scanning pulse, which releases the gate G, appropriately before the next modulation characteristic (phase shift) starts, since then the influence of preceeding phase shifts or distortions is smallest.

Shortly before the scanning of the modulation segment, the value of the reference phase stored in the first store SP1 is transferred to the second store SP2. The phase position of the succeeding modulation segment is fed in binary form into the now empty first store SP1 with the next scanning process. After each scanning the difference between the values inscribed in store SP1 and store SP2 is formed in the decoder DC. Corresponding to the definition of the modulation principle (phase difference modulation) a specific step-sequence is assigned to the resulting difference emitted by the decoder. After a possibly necessary recoding the step-sequence is directed to a parallel-series converter PSU, which emits the binary steps of the data signal at output A in series for forwarding to a data terminal device.

Figure 3:
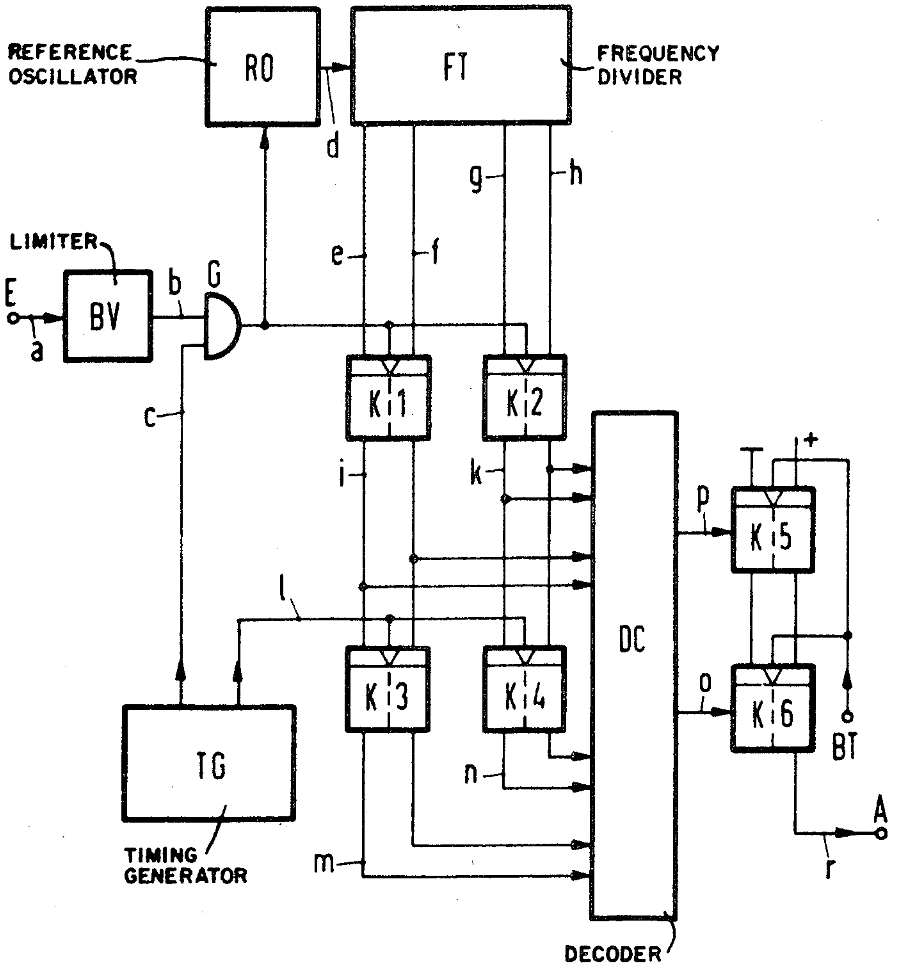
FIG. 3 is a schematic diagram of a preferred embodiment of a demodulator constructed according to the principles of the invention.

FIG. 3 illustrates a preferred embodiment of the demodulation circuit according to the invention for a 4-valued (quaternary) phase difference modulation.

Figure 4:
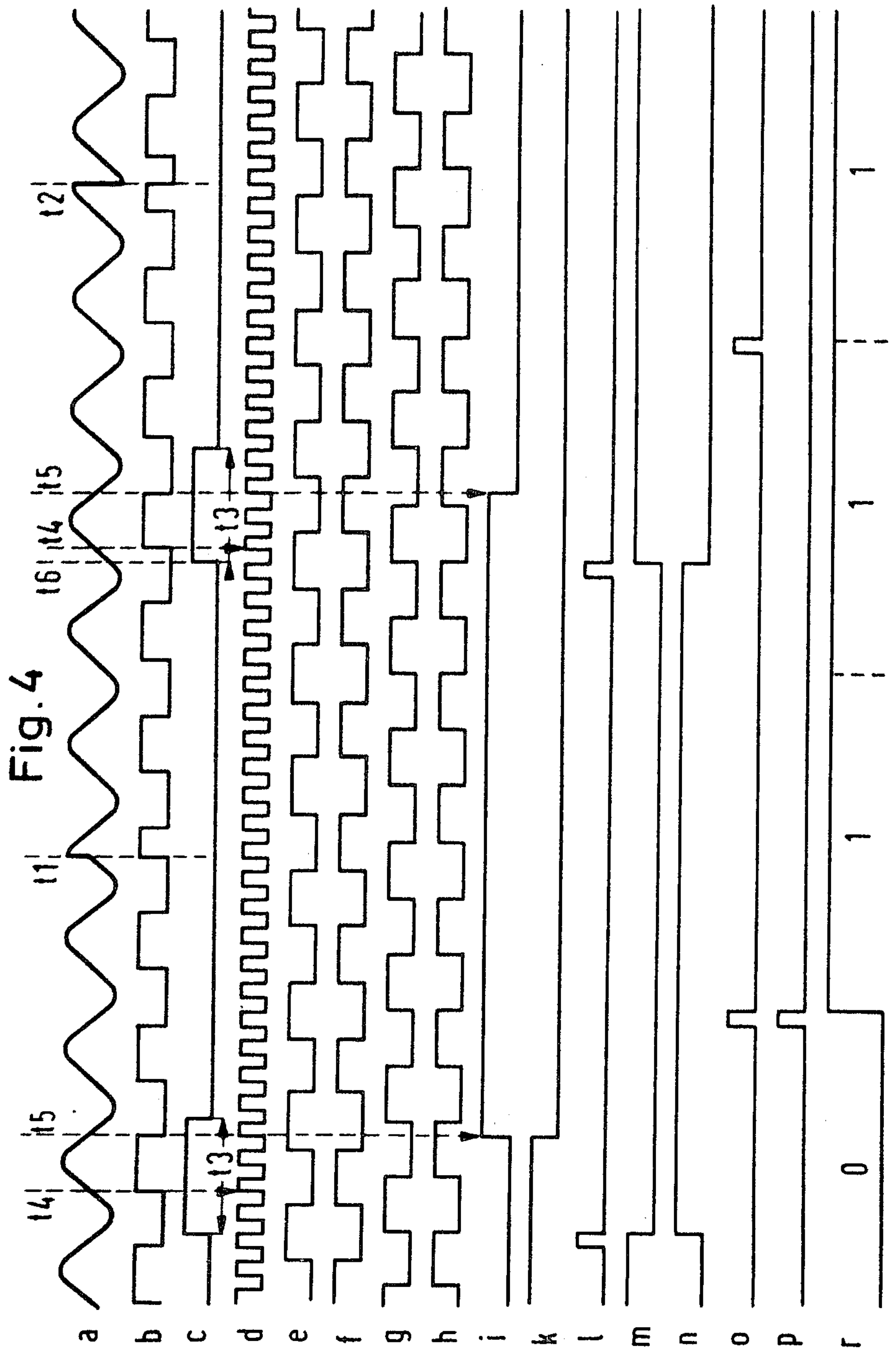
FIG. 4 is a waveform diagram for the demodulator of FIG. 3.

FIG. 4 shows the method of operation of the demodulator by means of a waveform diagram. The lines in FIG. 4 are denoted with small letters which appear in FIG. 3 at the places where the illustrated waveform patterns occur.

With 4-valued phase difference modulation four phase shifts are transmitted; namely, +90°, −90°, 180° and 0°. Step pairs (debits) are assigned to these phase jumps which have the following form: "00," "11," "01," and "10." To each step pair at the transmission end there is assigned a specific phase shift. The demodulator reforms the binary step pair from the received phase shift in the carrier frequency.

The carrier frequency with the phase shifts containing the message is applied to input E. Line *a* in FIG. 4 shows the carrier frequency with the phase shifts arising at moments *t*1 and *t*2. In the waveform diagrams the phase shifts are shown as sudden changes for better understanding. However, in practical operation only continuous phase changes occur in the receiving signal because of the band-limited elements in the course of the transmission filter, the transmission path, receiving filters, etc. The continuous phase changes impair in no way the method of operation of the demodulator, when the scanning takes place in the middle of the received modulation segment.

Line *b* in FIG. 4 shows the receiving signal clipped by a limiter BV, of known construction, which adjoins a gate G, and the crossovers of which contain the phase information. The timing generator TG, also of known construction, emits positive scanning pulses (line *c*) which have a duration of *t*3, which must be at least as long as a period of the rectangular waveform emitted by the limiter. The reference oscillator RO, which may be constructed in any manner to produce the desired signal, delivers a rectangular waveform (line *d*) at the output with a frequency which amount to n times the carrier frequency, *n* being the number of phase states to be transmitted. A subsequently connected frequency divider FT divides the reference frequency down to the carrier frequency, and the so divided reference signai at the outputs (lines *e*, *f*, *g*, *h*) in the various phase positions used for transmission.

The positive leading edge of the clipped carrier signal at moment *t*4 synchronizes the reference oscillator RO to the carrier frequency and fully corrects the desired phase position each time. The following negative trailing edge of the clipped signal effects the transfer of the phase position present at the output of the frequency divider to a first store SP1, which consists of flip-flop circuits K1 and K2. The outputs (lines *e*, *f*, *g*, and *h*) of the frequency divider are connected to the bias inputs of the flip-flop circuits K1 and K2, while the pulse arising at the output of the gate G is connected to the control input of the two flip-flop circuits. The rectangular waveforms connected to the same flip-flop circuit are displaced against each other in phase by 180°.

At moment *t*5, the flip-flop circuits K1 and K2 are turned on and store the just determined reference phase position of the frequency divider. The outputs of the flip-flop circuits K1 and K2 are represented in lines *i* and *k*. The other output of the flip-flop circuit contains the signal displaced 180° in the phase. The output potentials of the flip-flop circuits are connected, as biases, to two further flip-flop circuits K3, K4, which serve as second store SP2. Shortly before scanning (line *c*) of the clipped carrier frequency, the timing generator emits a transfer impulse (line 1) which transfers the phase value stored in the flip-flop circuits K1 and K2 in binary form to the flip-flop circuits K3 and K4. For the next scanning the first store is available at moment t6 for a new storing of a phase value. Lines m and n show the outputs of the flip-flop circuits K3 and K4. With the ensuing scanning the flip-flop circuits K1 and K2 are set to the phase of the new modulation segment. After the scanning, the difference between the phase positions held in stores SP1 and SP2 is formed and after a possibly necessary recoding, corresponding to the original coding, are emitted as potential values (lines *o* and *p*). The output lines of the decoder deliver the potential to the flip-flop circuits K5 and K6, which are connected as parallel-series converters and are controlled over line BT with a step-cycle. The step cycle is also taken from the timing generator. The outputs (lines *o* and *p*) of the decoder control the flip-flop circuits directly, so that the applicable flip-flop circuit flips over immediately when a potential impulse arises. The binary data signal (line *r*) is emitted at output A.

In transmission of *n* phase positions, *n* potentials are necessary which are taken from the frequency divider and which represent the phase positions arising in the transmission. For each of the two stores SP1 and SP2, then, *n*/2 flip-flop circuits are necessary. Thus, for example, with a 4-valued phase difference modulation four phase positions of the reference oscillator (lines *e* through *h*) are generated and each store requires two flip-flop circuits (K1, K2, and K3, K4).

Figure 5:
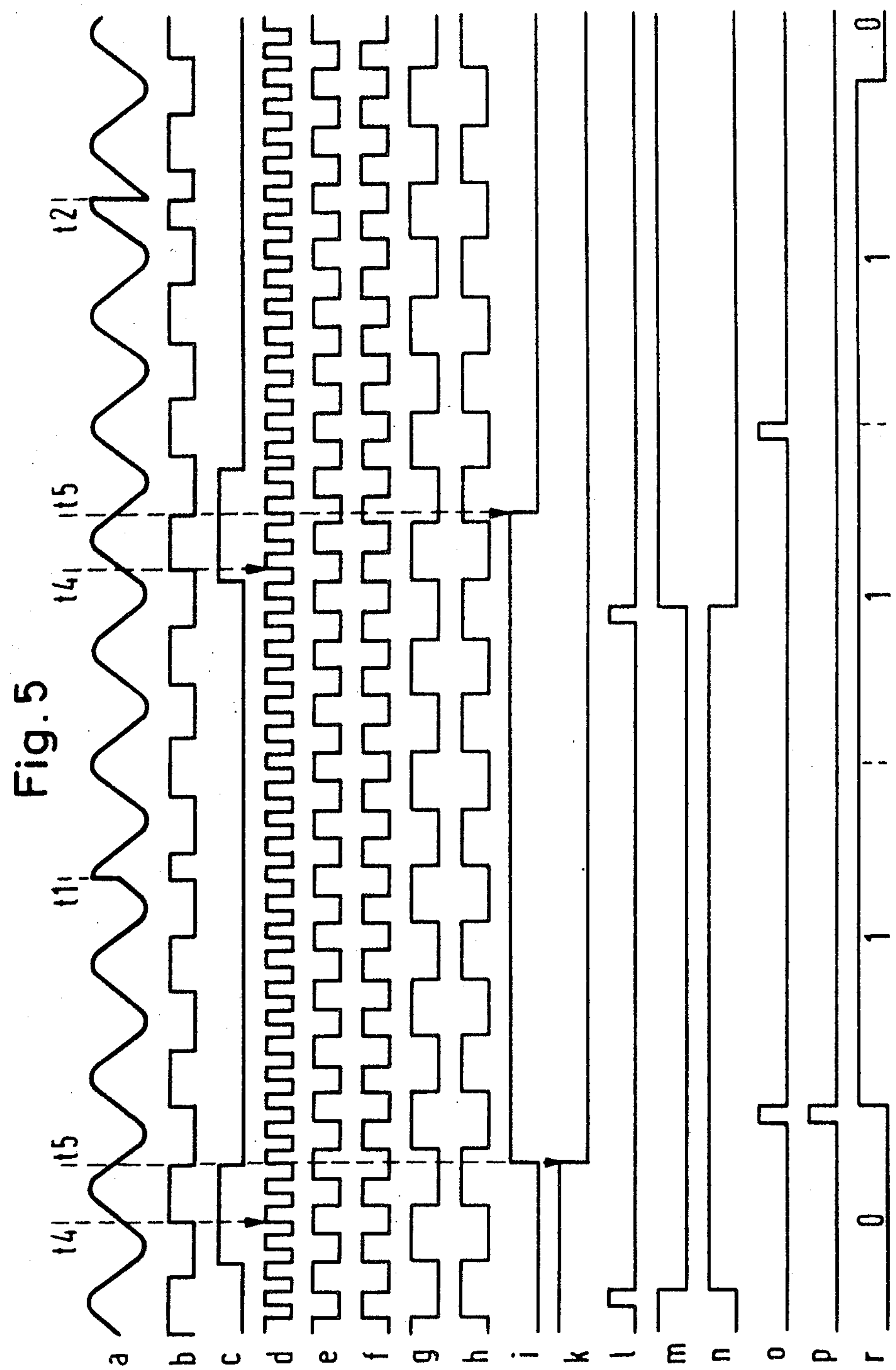
FIG. 5 is a waveform diagram for a variation of the demodulator of FIG. 3.

FIG. 5 is a waveform diagram for a variation of the demodulator in FIG. 3. Here also a four stage phase difference modulation is assumed, so that the schematic diagram in FIG. 3 suffices for understanding FIG. 5, i.e., the construction of the preferred embodiment remains the same. FIG. 5 differs from FIG. 4 only in lines *e* and *f*. In FIG. 4, the individual reference phases are produced at the end of the frequency divider. In an arrangement which operates according to the diagram in FIG. 5, a position of the reference phase is removed directly from the divider stages within the frequency divider. Thus, the rectangular potential in lines *e* and *f* of the next to last divider stage are removed, while the rectangular potential in lines *g* and *h* arises at the output of the last divider stage. With construction of the frequency divider with bistable flip-flop circuits two opposite phase rectangular waveforms (lines *e* and *f*, i.e., *g* and *h*) arise at both outputs of each flip-flop circuit. Otherwise, the circuit operates in the same way as in FIG. 4.

At moment *t*4, the synchronization of the reference oscillator to the carrier frequency occurs, and at moment *t*5, the negative trailing edge of the clipped carrier waveform feeds the reference phase instantly present into the first store SP1. Shortly, before the scanning of the clipped carrier, the transfer of the contents of the first store SP1 into the second SP2 occurs. The subsequently connected decoder forms the difference of the contents of the stores and emits the binary data over a parallel-series converter, in accordance with the coding.

In the practical execution of nlast mentioned version of the demodulator there results a substantial decrease in cost in the stores SP1 and SP2, as well as in the frequency divider FT. This statement is equally applicable to other than 4-valued phase difference modulation. In an *n*-valued phase difference modulation 2·1d n phase-shifted rectangular waveforms must be taken from the frequency divider, and each of the two stores required *ld n* bistable flip-flop circuits. With a 4-valued phase difference modulation, four reference potentials and two flip-flop circuits are necessary for each store. In an 8-valued difference modulation, six reference potentials and three bistable flip-flop circuits are necessary for each store, whereas in a 16-valued phase difference modulation, eight reference potentials and four flip-flop circuits are necessary for each store.

The above described preferred embodiment of the invention is described to illustrate the principles of the invention, but it in no way is to be considered as limiting the scope of the invention. The scope of the invention is defined by the appended claims.

I claim:

1. Apparatus for demodulating phase difference modulated data signals wherein the data signals are transmitted by modulating a carrier frequency with pre-determined phase shifts corresponding to specific data signal levels comprising:

a reference oscillator for generating as many phases of a reference frequency signal as the number of said pre-determined phase shifts, a timing generator for generating a scanning pulse between phase shifts, said timing generator being constructed to produce a scanning pulse having a minimum duration equal to the period of said carrier frequency, first storage means activated by said scanning pulse to receive and store an input, said first storage means being activated for the duration of said scanning pulse, means for generating a gating pulse responsive to a zero cross-over of the received carrier frequency during the duration of said scanning pulse, means responsive to said gating pulse for transmitting the one of said reference phases corresponding to the instantaneous carrier phase to said first storage means, second storage means, means for transmitting the information in said first storage means to said second storage means prior to the initiation of the next scanning pulse, and decoder means for producing a signal corresponding to the difference between the values in said first and second storage means.

2. The apparatus defined in claim 1 wherein said means responsive to said gating pulse includes:

a limiter connected at the input to said apparatus for clipping the received modulated carrier signal and a gate means, said scanning pulse and said received signal being applied to said gate means, the output of said gate means being applied to said reference oscillator for controlling the operation of same.

3. The apparatus defined in claim 2 wherein said reference oscillator emits a frequency with *n*-valued phase difference modulation having *n* times the value of the carrier frequency, and further comprising a frequency divider which divides the reference frequency to the carrier frequency and emits a reference positioned at the output of said frequency divider, the outputs of said frequency divider being connected to said first storage means, said frequency divider outputs being transmitted to said first storage means responsive to said gating pulse.

4. The apparatus defined in claim 3 wherein said first and second storage means are bistable flip-flop circuits, to outputs of said frequency divider being connected to biased inputs of said flip-flop circuits of said first storage means, the output of said first storage means being connected to biased input of said second storage means, control inputs of said first storage means being connected to receive said gating pulse, control inputs of said second storage means being connected jto an output of said timing generator and outputs of said first and second stroage means being connected to said decoder.

5. The apparatus defined in claim 4 wherein said first and second storage means each comprise $n/2$ bistable flip-flop circuits for $n$-valued phase difference modulation.

6. The apparatus defined in claim 3 wherein said frequency divider emits said phase positions as rectangular wave forms.

7. The apparatus defined in claim 1 further comprising means for synchronizing said reference oscillator with said carrier phase in the duration of said scanning pulse.

* * * * *